3,577,346
INSULATED ELECTRICAL CONDUCTORS HAVING CORONA RESISTANT POLYMERIC INSULATION CONTAINING ORGANO METALLIC COMPOUNDS
James J. McKeown, Mahtomedi, Minn., assignor to Minnesota Mining and Manufacturing Company, St. Paul, Minn.
No Drawing. Continuation-in-part of application Ser. No. 555,695, June 7, 1966. This application Nov. 14, 1968, Ser. No. 775,958
Int. Cl. C08f *45/62;* C08g *51/62;* H01b *3/28*
U.S. Cl. 252—63.5                    49 Claims

ABSTRACT OF THE DISCLOSURE

Insulated electrical conductors having improved corona resistance comprising a metal conductor surrounded by a major portion of a dielectric polymer containing intermixed therewith a minor amount of an organo-metallic compound of a metal selected from silicon, germanium, tin, lead, phosphorous, arsenic, antimony, bismuth, iron, ruthenium and nickel and a method for the preparation of the insulated electrical conductors.

---

This is a continuation-in-part of the copending application Ser. No. 555,695, filed June 7, 1966, now abandoned.

The present invention relates to methods for the preparation of corona resistant insulated electrical conductors and to the insulated conductors themselves.

In certain environments solid dielectric materials which are used to insulate electrical conductors are subject to voltages in excess of the corona starting voltage during operation (e.g. in certain electric motor applications). In such cases, the life of the dielectric is greatly reduced by failure due to corona breakdown, particularly when the dielectric is a solid polymer. Thus improvements in the resistance to corona of polymeric materials is much to be desired.

A specific problem is the resistance to corona of organic polymer dielectric materials in high voltage applications in which there is a gap over which corona discharges can occur (e.g. greater than about one mil) between the dielectric and the conductor or a void within the material itself. Under such conditions, the life of dielectric materials is often much shorter than under the same conditions where there is no such gap or void and a dielectric which will retain its electrical insulation properties for longer periods of time under such conditions is also to be desired.

Accordingly, it is an object of the present invention to provide new insulated electrical conductors having improved resistance to corona and of improved breakdown strength.

It is another object of the invention to provide a method for preparing insulated conductors of improved resistance to corona and of improved breakdown strength.

It is a further object of the invention to provide electrical conductors coated with compositions which have relatively long corona lives.

It is a further object of the invention to provide electrical insulation materials which are useful in applications in which they are subject to high voltages for extended periods of time.

It is a further object of the invention to provide a method for providing a high voltage and corona resistant insulation on an electrical conductor.

Other objects of the invention will become apparent to those skilled in the art upon reading the following specification.

The present invention relates to a method for improving the voltage endurance and corona resistance of a solid dielectric organic polymer selected from polyacrylics, polydienes, polyvinyls, polyolefines, polyesters, polyethers, polyamides, polysulfones, polycarbonates, polysulfides, polyepoxides, polyureas and polyurethanes and copolymers thereof. The organic dielectric polymers useful in the invention contain recurring carbon atoms in the main chains thereof and normally contain recurring carbon-carbon bonds in the main chains. The main chains of the polymers contain a major proportion of carbon atoms, i.e. at least half of the atoms in the main chains are carbon atoms.

The improvement in the voltage endurance and corona resistance of these polymers is accomplished by mixing with the polymer a minor amount of an organo-metallic compound (preferably from about 0.1 to 20 percent based upon the final weight of the polymer). The organo-metallic compound includes a metal selected from a class of elements of Groups IV–B, V–B and VIII of the Periodic Table of Elements having atomic numbers from 14 to 83 inclusive, said metal being bonded through carbon to the organic portion of the molecule. The organo-metallic compound is intimately intermixed with and is preferably dissolved in the polymer. The Periodic Chart of the Elements referred to herein is published inside the back cover of the text Chemistry of Organic Compounds by Carl R. Noller, reprinted August 1952, and published by the W. B. Saunders Company, Philadelphia, Pa. The metals of particular interest included in the foregoing class are silicon, germanium, tin, lead, phosphorous, arsenic, antimony, bismuth, iron, ruthenium and nickel. The invention also relates to a method of making an insulated electrical conductor suitable for high voltages and of improved corona resistance which comprises forming about an electrical conductor the mixture of the polymer and the organo-metallic compound and to the insulated electrical conductors themselves.

There are one or more metal atoms in the organo-metallic compounds which are suitable for use in the present invention, but usually not more than two. There can be a maximum of five full bonds or the equivalent thereof between any metal atom and carbon atoms in the organic groups, preferably from two to four such bonds. In most cases these are full bonds between one carbon atom and one metal atom. In some cases, however, the bonds are shared by more than one carbon atom. Thus in ferrocene the equivalent of two full bonds with a single metal atom are shared equally by ten carbon atoms (pi bonding). The organic group or groups can be aromatic, aliphatic or araliphatic. The metal atom can have one or more (usually not more than 2) electronegative groups covalently or ionically bonded to it in the organo-metallic compound although this is not necessary. Such electronegative groups include oxide, halide, sulfide, hydroxide, etc.

Preferably, the organometallic compound is added in the amount of from about 0.1 to 20 percent by weight of the polymer. Lesser amounts of the additive are insufficient to have a desired effect and greater amounts thereof are unnecessary. Ordinarily, from about 1 to 20 percent of additive (based on the weight of the final polymer) is utilized and from about 1 to 10 percent is preferred. The polymer additive mixture is solid at ordinary temperatures, e.g. 20° C. and normally at the operating temperature of the device in which it is used.

The technique for incorporating the organo-metallic compound into the insulating organic polymer depends on properties of the polymer. It can be readily milled into elastomers (with conventional milling equipment), mixed into liquid polymers or polymer solutions (such as liquid epoxy or other resins, thermoplastic melts or solutions), mixed with a powdered polymer, etc. Conversion to the desired shape and form can be accomplished by an appropriate technique such as by extrusion, casting, molding (e.g. compression molding or injection molding), coating, etc. In some cases it will also be necessary during conversion to cure and/or remove volatiles from the polymer.

An alternate technique which can be used is to coat the surface of a film of the polymer with the organo-metallic compound (often the surfaces of several thin films are coated then stacked). A glow discharge can, for example, be used for forming a highly insulating yet corona resistant coating on the film. This technique is usually used when the polymer is such that its processing conditions might result in the decomposition of the organo-metallic compound (e.g. polytetrafluoroethylene).

Among the organo-metallic compounds which can be used in the practice of the invention are aryl and/or alkyl silane compounds such as triphenyl silane, aryl and/or alkyl germanium compounds such as triphenyl germane; aryl and/or alkyl tin compounds such as tetraphenyl tin, bis tributyl tin oxide, tributyl tin chloride and dibutyl tin dichloride; aryl and/or alkyl lead compounds such as tetraphenyl lead; aryl and/or alkyl phosphorous compounds such as triphenyl phosphorous; aryl and/or alkyl arsenic compounds such as triphenyl arsenic oxide; aryl and/or alkyl antimony compounds such as triphenyl antimony dichloride; aryl and/or alkyl bismuth compounds such as trinaphthyl bismuth; biscyclo pentadienyl iron (ferrocene) and derivatives thereof such as acetyl ferrocene; etc.

The polymers which can be used in the practice of the invention are polyacrylics, polydienes, polyvinyls, polyolefines, polyesters, polyethers, polyamides, polysulfones, polycarbonates, polysulfides, polyepoxides, polyureas and polyurethanes and copolymers thereof. Included in the foregoing classes are polybutadienes, polyisoprenes, polychloroprenes, polystyrenes, polyisobutylenes, polyvinylchlorides, polyacrylonitriles, polychlorosulfonated ethylenes, polyethylenes, polypropylenes, polytetrafluoroethylenes, allyl resins, alkyd resins, cellulose esters (e.g. cellulose acetates), chlorinated polyethers, amino resins (e.g. prepared from urea, melamine and formaldehyde), copolymers of lower alkylenic monomers such as ethylene and propylene, copolymers of styrene and butadiene, copolymers of vinylidene fluoride and hexafluoropropene, copolymers of acrylonitrile, butadiene and styrene, etc. The foregoing include elastomeric and non-elastomeric polymers of the types included in the examples herein. Both thermoplastic and thermosetting polymers can be used. Preferably, the polymers are halogen free.

The following examples are offered to furnish a better understanding of the present invention, and are not to be construed as in any way limiting thereof. All parts are by weight unless otherwise specifically indicated. The word "mil" herein indicates 0.001 inch.

Corona life tests of the compositions of the invention and the controls prepared in the same way as the lots of the invention but containing no organo-metallic compound were run on these films utilizing the following procedure: The sample to be tested (in film form) was laid upon a grounded flat copper plate. The high voltage electrode (a ¼" by ½" rectangular plate of transformer core iron) was placed on top of the test film. The copper plate and the film being tested both extended beyond the periphery of the high voltage electrode on all sides. The corona discharges occurred largely from the edges of the high voltage electrode to the test film. Five replicate tests were run on each film. The tests were run at 1,042 cycles per second (c.p.s.), at room temperature (25° C.) and at 2500 volts. The effect of the relative humidity on the tests was eliminated by running them at zero percent relative humidity. The test time to failure of the third (median) sample of each replicate set was recorded. The test time of the third sample to fail was then reduced to equivalent 60 cycles per second (c.p.s.) by multiplying by 17.4 (1,042/60).

Plus signs in the data indicate that failure had not occurred at the time the final readings were taken for the tables and that the tests were continued thereafter. The control values shown have been adjusted to the same electrical stresses as the respective lots of the invention so that direct comparisons of the corona lives (i.e. time to corona breakdown) can be made.

EXAMPLE 1

Elastomeric polymers

The lots of this example were prepared as follows: Twenty-five grams of elastomer were banded together on a conventional laboratory rubber mill. No additional heat was supplied although the elastomer became warm due to the heat of working. One and one quarter grams of the desired organometallic compound were added to the banded elastomer and milling was continued until the mass appeared to be uniform. Twenty minutes normally was required to accomplish uniform distribution of the organometallic compound. The elastomer was remoxed from the mill and cut into small pieces which were subsequently compression molded at 300° F. for one minute to the desired film thickness. The elastomers were pressed between sheets of aluminum although polytetrafluoroethylene film was inserted between the aluminum and elastomer where needed to effect easy release of the elastomeric film. The control samples were milled and compression molded in the same manner. The compositions and test results of the various lots are given in the following tables:

| Lot No. | Elastomer | | | Organometallic additive |
|---|---|---|---|---|
| | Type | Manufacturing company | Trade designation | |
| 1 | Polyacrylic | B. F. Goodrich Chemical Company | Hycar polymer 4021 | Triphenyl silane. |
| 2 | Polyacrylonitrile | do | Hycar polymer 1001 | Trinaphthyl antimony. |
| 3 | Polyurethane | do | Estone polymer 5703F1 | Dicyclopentadienyl nickel. |
| 4 | Polyisoprene | Goodrich-Gulf Chemical Company, Inc | Ameripol polymer SN. | Acetyl ferrocene. |
| 5 | Polychloroprene | E. I. du Pont de Nemours and Co., Inc | Neoprene polymer WB. | Triphenyl arsenic. |
| 6 | Polychlorosulfonated ethylene | do | Hypalon polymer 40 | Dibutyl tin sulfide. |
| 7 | Polyisobutylene | Enjay Company, Inc | Vistanex polymer 200 | Triphenyl bismuth. |
| 8 | Copolymer of ethylene and propylene | do | EPR polymer 404 | Triphenyl lead chloride. |
| 9 | Polybutadiene | Phillips Petroleum Company | Trans polymer 4 | Ferrocene. |
| 10 | Copolymer of styrene and butadiene | Texas-U.S. Chemical Company | Symbol polymer 1502 | Dicyclopentadienyl ruthenium. |
| 11 | Polysulfide | Thiokol Chemical Corporation | Thiokol polymer ST | Bis tributyl tin oxide. |
| 12 | Copolymer of vinylidene fluoride and hexafluoro propene. | Minnesota Mining and Manufacturing Company | Fluorel polymer 2140 | Triphenyl phosphine. |

| | Electrical stress (volts/mil) | Corona life equivalent, 60 c.p.s. (hours) | | Increase in corona life due to additive, percent |
|---|---|---|---|---|
| | | Control | Polymer with additive | |
| Lot No.: | | | | |
| 1 | 100 | 230 | 960 | 317 |
| 2 | 96 | 110 | 1,560 | 1,320 |
| 3 | 100 | 727 | 2,450 | 238 |
| 4 | 109 | 132 | 3,160 | 2,390 |
| 5 | 100 | 142 | 3,820 | 2,590 |
| 6 | 100 | 447 | 18,500+ | 4,030+ |
| 7 | 100 | 245 | 18,500+ | 7,450+ |
| 8 | 100 | 1,480 | 18,500+ | 1,150+ |
| 9 | 100 | 2,210 | 18,500+ | 737+ |
| 10 | 100 | 2,500 | 8,350 | 234 |
| 11 | 104 | 9 | 47 | 422 |
| 12 | 100 | 148 | 412 | 178 |

EXAMPLE 2

Thermoplastic polymers

These polymers were also processed on a hot mill. The mill was preheated to 250° F. and 25 grams of the polymer was added and banded together on the mill. One and one quarter grams of the appropriate organometallic was then added and milling continued until the material appeared uniform. The mixture was cut into smaller pieces which were subsequently compression molded into 0.025" thick films at 300° F. Sheets of aluminum were placed on either side of the material during pressing in order to assure a smooth, flat surface on the film. A control without the organometallic compound was processed in a similar manner. The compositions and test results of the various lots are given in the following tables:

| Lot No. | Polymer | | | Organometallic additive |
|---|---|---|---|---|
| | Type | Manufacturing company | Trade designation | |
| 1 | Polyethylene | Dow Chemical Company | Dow polymer 1705 | Triphenyl arsenic. |
| 2 | Polyacrylate | E. I. du Pont de Nemours and Co., Inc. | Lucite polymer 147 | Triphenyl silane. |
| 3 | Acrylonitrile butdiene styrene terpolymer | Monsanto Chemical Company | Lustran I polymer 610 | Bis(tributyl tin) oxide. |
| 4 | Cellulose acetate | Eastman Tenite Company | 32806H6 | Triphenyl antimony oxide. |
| 5 | Polystyrene | Dow Chemical Company | Styron polymer 475 | Triphenyl antimony. |
| 6 | Polyvinyl chloride | Monsanto Chemical Company | Opalon natural 1038-009 | Tetraoctyl tin. |
| 7 | Chlorinated polyether | Hercules Powder Company | Penton polymer 9215E | Acetyl ferrocene. |

| | Electrical stress (volts/mil) | Corona life equivalent, 60 c.p.s. (hours) | | Increase in corona life due to additive, percent |
|---|---|---|---|---|
| | | Control | Polymer with additive | |
| Lot No.: | | | | |
| 1 | 100 | 1,100 | 8,050+ | 630 |
| 2 | 100 | 985 | 1,360 | 38 |
| 3 | 100 | 3,230 | 7,900 | 144 |
| 4 | 100 | 372 | 2,870 | 670 |
| 5 | 100 | 3,390 | 7,850 | 131 |
| 6 | 92 | 2,000 | 38,400+ | 1,820+ |
| 7 | 104 | 324 | 655 | 102 |

EXAMPLE 3

Twenty-five grams of polyethylene tetraphthalate was pulverized into a powder and mixed with 1.25 grams of tetraphenyl tin. A small quantity of the mixed powder was compression molded between sheets of aluminum at 520° F. The sample was cooled and cut into small pieces which were stacked and pressed into a film. This procedure was repeated until the film appeared uniform. A control sample was prepared in a similar manner. The corona life of the control at 100 volts/mil and room temperature was 960 60-cycle hours whereas the polymer with the organometallic compound lasted 6100 60-cycle hours for an improvement of 535%.

EXAMPLE 4

Twenty five grams of Hercules Profax 6523 polypropylene with 1.25 grams triphenyl bismuth was prepared according to the procedure of Example 3. The corona life of the control at 60 volts/mil and room temperature was 1640 60-cycle hours where the polypropylene with the triphenyl bismuth lasted 20,100 hours for an improvement of 1130%.

EXAMPLE 5

One gram of ferrocene was dissolved in 20 grams of a liquid epoxy resin and the resin was poured upon a glass plate which had been previously coated with a release agent. Twenty-five mil shims were placed on the plate and another coated plate was placed on top of the resin. The resin was cured at 170° F. for 16 hours. A control sample without the organometallic compound was prepared in a similar manner. The corona life of the resin without the additive was 835 60-cycle hours at 100 volts/mil and room temperature whereas the resin with the additive lasted 7830 60-cycle hours under similar conditions for an improvement of 840%.

EXAMPLE 6

Low density polyethylene (Dow 1705) was hot milled with the appropriate quantity of triphenyl antimony so the final concentration was 1, 3 or 5%. A control sample tested at room temperature and 100 volts/mil failed in 1000 hours. The samples with 1, 3 or 5% triphenyl antimony have been on test for more than 50,000 hours without any failures.

EXAMPLE 7

A 5-mil film of polytetrafluoroethylene was placed between two halves of a resin flask and evacuated to a reduced pressure on both sides. Ferrocene which had been previously placed in one chamber was vaporized at the reduced pressure. The voltage between two electrodes, which had also been previously placed within the resin flask, was increased until a glow discharge developed. The glow discharge caused the ferrocene vapor to form a tough coating which adhered to the polytetrafluoroethylene. This coating derived from ferrocene was highly insulating. Films of the coated polytetrafluoroethylene were stacked to a total thickness of 25-mil, with the coated sides facing the active electrode and the corona resistance measured and compared with a control. The corona life of the polytetrafluoroethylene with the coating was 5700 60-cycle hours whereas the control failed in 410 60-cycle hours to give an improvement of 1290%.

These insulations with improved corona resistance are highly useful in electric motors and generators, cables such as power transmission cables, capacitors, transformers and other such electric equipment where high voltages are normally encountered.

What is claimed is:

1. In an insulated electric device suitable for high voltages, comprising an electric conductor means and an electric insulator in insulating proximity thereto, the following improvement serving to provide improved corona resistivity, said conductor means being insulated with a solid dielectric organic polymer selected from the group consisting of polyacrylics, polydienes, polyolefines, polyesters, polyethers, polyamides, polysulfones, polycarbonates, polysulfides, polyepoxides, polyureas and polyurethanes and copolymers thereof, said polymer containing intimately intermixed therewith from about 1 to 20 percent of an aromatic, aliphatic or araliphatic organometallic compound based upon the weight of the polymer where the organometallic compound includes a metal selected from the class consisting of silicon, germanium, tin, lead, phosphorous, arsenic, antimony, bismuth, iron, ruthenium and nickel, each organic group in the organometallic compound being bonded directly through carbon to the metal therein.

2. An insulated device according to claim 1 wherein the organometallic compound contains silicon.

3. An insulated device according to claim 1 wherein the organometallic compound contains tin.

4. An insulated device according to claim 1 wherein the organometallic compound contains lead.

5. An insulated device according to claim 1 wherein the organometallic compound contains phosphorus.

6. An insulated device according to claim 1 wherein the organometallic compound contains arsenic.

7. An insulated device according to claim 1 wherein the organometallic compound contains antimony.

8. An insulated device according to claim 1 wherein the organometallic compound contains bismuth.

9. An insulated device according to claim 1 wherein the organometallic compound contains iron.

10. An insulated device according to claim 1 wherein the organometallic compound contains ruthenium.

11. An insulated device according to claim 1 wherein the organometallic compound contains nickel.

12. An insulated device according to claim 1 wherein the organometallic compound contains an electronegative group bonded to the metal therein.

13. An insulated device according to claim 1 wherein the dielectric polymer is a polyacrylic.

14. An insulated device according to claim 1 wherein the dielectric polymer is a polydiene.

15. An insulated device according to claim 1 wherein the dielectric polymer is a polyolefine.

16. An insulated device according to claim 1 wherein the dielectric polymer is a polyester.

17. An insulated device according to claim 1 wherein the dielectric polymer is a polyether.

18. An insulated device according to claim 1 wherein the dielectric polymer is a polysulfide.

19. An insulated device according to claim 1 wherein the dielectric polymer is a polyepoxide.

20. An insulated device according to claim 1 wherein the dielectric polymer is a polyurethane.

21. An insulated device according to claim 1 wherein the dielectric polymer is halogen-free.

22. An insulated device according to claim 1 wherein the dielectric polymer is a polyethylene.

23. An insulated device according to claim 1 wherein the dielectric polymer is a copolymer of ethylene and propylene.

24. An insulated electrical conductor having improved resistance to corona comprising a metal conductor insulated by a solid dielectric organic polymer selected from the group consisting of polyacrylics, polydienes, polyolefines, polyesters, polyethers, polyamides, polysulfones, polycarbonates, polysulfides, polyepoxides, polyureas and polyurethanes and copolymers thereof, said polymer containing intimately intermixed therewith from about 1 to 20 percent of an aromatic, aliphatic or araliphatic organometallic compound based upon the weight of the polymer where the organometallic compound includes silicon, each organic group in the organometallic compound being bonded directly through carbon to the silicon therein.

25. An insulated electrical conductor having improved resistance to corona comprising a metal conductor insulated by a solid dielectric organic polymer selected from the group consisting of polyacrylics, polydienes, polyolefines, polyesters, polyethers, polyamides, polysulfones, polycarbonates, polysulfides, polyepoxides, polyureas and polyurethanes and copolymers thereof, said polymer containing intimately intermixed therewith from about 1 to 20 percent of an aromatic, aliphatic or araliphatic organometallic compound based upon the weight of the polymer where the organometallic compound includes antimony, each organic group in the organometallic compound being bonded directly through carbon to the antimony therein.

26. An insulated electrical conductor having improved resistance to corona comprising a metal conductor insulated by a solid dielectric organic polymer selected from the group consisting of polyacrylics, polydienes, polyolefines, polyesters, polyethers, polyamides, polysulfones, polycarbonates, polysulfides, polyepoxides, polyureas and polyurethanes and copolymers thereof, said polymer containing intimately intermixed therewith from about 1 to 20 percent of an aromatic, aliphatic or araliphatic organometallic compound based upon the weight of the polymer where the organometallic compound includes iron, each organic group in the organometallic compound being bonded directly through carbon to the iron therein.

27. In a method of making an insulated electrical conductor suitable for high voltages and of improved corona resistance, the improvement which comprises forming about an electrical conductor a solid mixture of a solid dielectric organic polymer selected from the group consisting of polyacrylics, polydienes, polyolefines, polyesters, polyethers, polyamides, polysulfones, polycarbonates, polysulfides, polyepoxides, polyureas and polyurethanes and copolymers thereof and from about 1 to 20 percent of an aromatic, aliphatic or araliphatic organometallic compound based upon the weight of the polymer where the organometallic compound includes a metal selected from the class consisting of silicon, germanium, tin, lead, phosphorous, arsenic, antimony, bismuth, iron, ruthenium and nickel, each organic group in the organometallic compound being bonded directly through carbon to the metal therein.

28. A method according to claim 27 wherein the organometallic compound contains silicon.

29. A method according to claim 27 wherein the organometallic compound contains tin.

30. A method according to claim 27 wherein the organometallic compound contains lead.

31. A method according to claim 27 wherein the organometallic compound contains phosphorus.

32. A method according to claim 27 wherein the organometallic compound contains arsenic.

33. A method according to claim 27 wherein the organometallic compound contains antimony.

34. A method according to claim 27 wherein the organometallic compound contains bismuth.

35. A method according to claim 27 wherein the organometallic compound contains iron.

36. A method according to claim 27 wherein the organometallic compound contains ruthenium.

37. A method according to claim 27 wherein the organometallic compound contains nickel.

38. A method according to claim 27 wherein the organometallic compound contains an electronegative group bonded to the metal therein.

39. A method according to claim 27 wherein the dielectric polymer is a polyacrylic.

40. A method according to claim 27 wherein the dielectric polymer is a polydiene.

41. A method according to claim 27 wherein the dielectric polymer is a polyolefine.

42. A method according to claim 27 wherein the dielectric polymer is a polyester.

43. A method according to claim 27 wherein the dielectric polymer is a polyether.

44. A method according to claim 27 wherein the dielectric polymer is a polysulfide.

45. A method according to claim 27 wherein the dielectric polymer is a polyepoxide.

46. A method according to claim 27 wherein the dielectric polymer is a polyurethane.

47. A method according to claim 27 wherein the dielectric polymer is halogen-free.

48. A method according to claim 27 wherein the dielectric polymer is a polyethylene.

49. A method according to claim 27 wherein the dielectric polymer is a copolymer of ethylene and propylene.

References Cited

UNITED STATES PATENTS

| | | | |
|---|---|---|---|
| 3,389,111 | 6/1968 | McKeown et al. | 117—128.4 |
| 3,243,394 | 3/1966 | Dietz | 117—232 |
| 3,264,256 | 8/1966 | Mack | 260—45.75 |
| 3,267,149 | 8/1966 | Garner | 260—45.7X |
| 3,313,760 | 4/1967 | Barnes et al. | 117—232X |
| 3,398,114 | 8/1968 | Pollock | 260—45.75 |
| 3,423,482 | 1/1969 | Katsumura et al. | 260—45.75X |
| 3,442,852 | 5/1969 | Dorfelt et al. | 260—45.75 |
| 3,468,840 | 9/1969 | Heiberger et al. | 260—45.75X |

JOHN T. GOOLKASIAN, Primary Examiner

M. E. McCAMISH, Assistant Examiner

U.S. Cl. X.R.

117—232; 174—110.44; 252—63.2; 260—45.75